(12) United States Patent
Lee et al.

(10) Patent No.: US 8,509,080 B2
(45) Date of Patent: Aug. 13, 2013

(54) NETWORK TRAFFIC ACCELERATOR

(75) Inventors: Jack Yiu-Bun Lee, Kowloon (HK); Wing-San Wan, Tseung Kwan O (HK)

(73) Assignee: The Chinese University of Hong Kong, Hong Kong (CN)

( * ) Notice: Subject to any disclaimer, the term of this patent is extended or adjusted under 35 U.S.C. 154(b) by 456 days.

(21) Appl. No.: 12/821,613

(22) Filed: Jun. 23, 2010

(65) Prior Publication Data

US 2010/0329117 A1    Dec. 30, 2010

Related U.S. Application Data

(60) Provisional application No. 61/221,286, filed on Jun. 29, 2009.

(51) Int. Cl.
*H04L 1/00* (2006.01)
(52) U.S. Cl.
USPC .................. 370/235; 370/395.2; 370/395.52
(58) Field of Classification Search
USPC .............. 370/229, 230, 230.1, 231, 235, 351, 370/389, 395.1, 395.2, 395.5, 395.52
See application file for complete search history.

(56) References Cited

U.S. PATENT DOCUMENTS

| | | | |
|---|---|---|---|
| 6,219,713 B1 | 4/2001 | Ruutu et al. | |
| 6,438,101 B1 | 8/2002 | Kalampoukas et al. | |
| 6,687,227 B1 * | 2/2004 | Li et al. | 370/231 |
| 6,772,375 B1 | 8/2004 | Banga | |
| 7,035,291 B2 | 4/2006 | Grinfeld | |
| 7,142,508 B2 | 11/2006 | Tobagi et al. | |
| 7,469,296 B2 | 12/2008 | Dierks, Jr. et al. | |
| 2002/0080721 A1 | 6/2002 | Tobagi et al. | |
| 2002/0095519 A1 | 7/2002 | Philbrick et al. | |
| 2002/0176443 A1 | 11/2002 | Wei et al. | |
| 2003/0032391 A1 * | 2/2003 | Schweinhart et al. | 455/12.1 |

(Continued)

FOREIGN PATENT DOCUMENTS

| | | |
|---|---|---|
| CN | 1778079 A | 5/2006 |
| CN | 101369877 A | 2/2009 |

(Continued)

OTHER PUBLICATIONS

International Search Report corresponding to the PCT application No. PCT/CN2010/074702, date of mailing Oct. 21, 2010, 10 pages total.

(Continued)

*Primary Examiner* — Obaidul Huq
(74) *Attorney, Agent, or Firm* — Kilpatrick Townsend & Stockton LLP; Kenneth R. Allen

(57) ABSTRACT

In a packet communication system with large bandwidth delay product (BDP) and employing Transmission Control Protocol (TCP), the reported advertised window size as advertised by a receiver is employed only as an indication of window size and not as a throughput limit so that more data is sent than the amount specified by the advertised window size. Since the receiver can process all incoming TCP packets, the receiving buffer is consistently near empty. Since the TCP's advertised window size is not accepted as the absolute amount of buffer space available at the receiver, the sender is not constrained by the absolute value of the receiver's advertised window size and instead can transmit more data than the absolute value of the advertised window, enabling the system to increase the actual window size without modifying the link ends. This improved large-BDP-capable protocol is denoted TCP-SC.

4 Claims, 2 Drawing Sheets

(56) References Cited

U.S. PATENT DOCUMENTS

| | | |
|---|---|---|
| 2005/0068896 A1 | 3/2005 | Pazos |
| 2005/0141419 A1 | 6/2005 | Bergamasco et al. |
| 2005/0228896 A1 | 10/2005 | Nishida |
| 2006/0268710 A1 | 11/2006 | Appanna et al. |

FOREIGN PATENT DOCUMENTS

| | | | |
|---|---|---|---|
| EP | 1793557 A1 | 6/2007 | |
| JP | 2002-077263 A | 3/2002 | |
| WO | WO 02/052427 A1 | 7/2002 | |

OTHER PUBLICATIONS

Jack Yiu-Bun Lee et al., TCP-SuperCharger : A New Approach to High-Throughput Satellite Data Transfer, pp. 1-7, Proc. 27th International Symposium on Space Technology and Science, Epochal Tsukuba, Tokyo, Japan, Jul. 5 to 12, 2009.

\* cited by examiner

NETWORK TRAFFIC ACCELERATOR

CROSS-REFERENCES TO RELATED APPLICATIONS

NOT APPLICABLE

BACKGROUND OF THE INVENTION

This invention relates to digital data communication and techniques for improving throughput of channels subject to large bandwidth-delay product, such as satellite-based communication links and mobile data networks.

It is known that the de facto standard for transmitting data over networks, Transmission Control Protocol (TCP), does not perform well in satellite or mobile communication networks due to the very large bandwidth-delay product (BDP) of the channel. For example, a communication satellite having channel bandwidth capacity between 24 Mbps and 155 Mbps. has a round-trip-delay (RTT) of 500 ms, so the lowest bandwidth of 24 Mbps will lead to a bandwidth-delay product of 1.5 MB—a value far exceeding the maximum advertised window size of TCP of 64 KB. In this case TCP's flow control mechanism will limit the throughput to no more than 1 Mbps, which is less than 5% of the satellite's link-layer bandwidth capacity, as hereinafter explained.

TCP Flow Control

TCP has a built-in flow control mechanism that is designed to prevent a fast sender from overflowing a slow receiver. It works by reporting the receiver's buffer availability, i.e., the advertised window, back to the sender via a 16-bit field inside the TCP header so that the sender can prevent sending more data than the receiver's buffer can store. Computer processing power has grown tremendously such that computers can now easily keep up with the arriving stream of data up to hundreds of Mbps data rate. Thus an arrived packet will quickly be retrieved by the application from the receiver buffer, and in most cases this can be completed even before the next packet arrival. As a result, the reported advertised window (AWnd) simply stays at the maximum receiver buffer size. In such cases TCP's flow control mechanism is not activated at all, as it is not needed.

However TCP's flow control mechanism can become the performance bottleneck in networks with a large bandwidth delay product (BDP). Consider the scenario where a sender is connected to a receiver over a large BDP link (100 Mbps, 250 ms one-way delay, BDP=50 Mb). Ignoring processing time, when the sender receives an acknowledgement (ACK), the reported advertised window (AWnd) size is in fact the value 250 ms prior to current time (i.e., 34 KB). During this time, the receiver application could have retrieved additional data from the receiver buffer, thereby freeing up more buffer space (i.e., 64 KB).

Due to the delayed AWnd, the sender cannot send more than the reported AWnd and thus cannot make use of the extra buffer space available at the receiver. In cases where the BDP is larger than the maximum AWnd, the sender will operate in a stop-and-go manner resulting in severe underutilization of the network channel.

The conventional solution to the above problem is to make use of TCP's Large Window Scale (LWS) extension as defined in the TCP protocol Request For Comments RFC 1323. This extension allows TCP to negotiate during connection setup a multiplier to apply to the window size so that a window size larger than 64 KB can be used. However, this approach relies on two assumptions: First, either the operating system or the application needs to be modified to explicitly make use of TCP's LWS extension. Second, there must be a way for the application to request the use of LWS during connection setup.

While these two assumptions can be easily satisfied in the laboratory where custom network applications and operating systems can be developed to exploit TCP's LWS extension, they will likely prevent the vast amount of network applications already available in the Internet to benefit from TCP's LWS extension.

Much research has been done to improve the performance of TCP in certain large networks. The existing research is classified in three categories: modifying both sender and receiver; modifying the sender only; and modifying the receiver only. Each of the categories is briefly characterized here by way of background.

Sender-Receiver-Based Approaches

Jacobson et al. "RFC 1323: TCP extensions for high performance," May 1992, RFC1323 proposed the Large Window Scale (LWS) extension to TCP which is currently the most widely supported solution. It works by scaling the advertised window (AWnd) by a constant factor throughout the connection. With the maximum LWS factor 14, the maximum AWnd can be increased up to 1 GB ($(2^{16}-1)*2^{14} \approx 2^{30}$). Alternatively, the application can be modified to initiate multiple TCP connections in parallel to increase throughput by aggregating multiple TCP connections, as described in Lee, D. Gunter, B. Tierney, B, Allcock, J. Bester, J. Bresnahan and S. Tuecke, "Applied Techniques for High Bandwidth Data Transfers Across Wide Area Networks," *Proceedings of International Conference on Computing in High Energy and Nuclear Physics*, September 2001 and H. Sivakumar, S. Bailey and R. Grossman, "PSockets: The Case for Application-level Network Striping for Data Intensive Applications using High Speed Wide Area Networks," *Proceedings of Super Computing*, November 2000. This approach effectively multiplies the AWnd and the congestion window (CWnd) by the number of TCP flows and so can mitigate the AWnd limitation. However, aggregating multiple TCP connections will also allow the application to gain an unfair amount of bandwidth from competing TCP flows. Hacker et al. (T. Hacker, B. Noble and B. Athey, "Improving Throughput and Maintaining Fairness using Parallel TCP," *Proceedings of IEEEInfocom* 2004, March 2004) solved this problem by deferring CWnd increase until multiple acknowledgements (ACKs) are received so as to compensate for the larger window size.

Sender-Based Approaches

Apart from AWnd limit, the congestion window maintained by the sender may also limit throughput of TCP in large BDP-type networks. Specifically, the growth of the CWnd is triggered by the arrival of the ACKs. Thus in a long delay path it may take a longer time for the CWnd to grow to sufficiently large value so that the link bandwidth can be fully utilized.

To address this problem Allman et al. (M. Allman, S. Floyd and C. Partridge, "RFC 3390: Increasing TCP's Initial Window," October 2000) proposed in RFC3390 to initialize the CWnd to a larger value (as opposed to one TCP segment) so that it can grow more quickly in large delay networks to ramp up TCP's throughput. Since then, much effort had been out into developing more sophisticated congestion control algorithms such as CUBIC (I. Rhee and L. Xu "CUBIC: A new TCP-friendly high-speed TCP variant," *Proceedings. PFLD-Net* '05, February 2005), BIC (L. Xu, K. Harfoush and I. Rhee, "Binary Increase Congestion Control (BIC) for Fast Long-Distance Networks," *In Proceedings of IEEE INFOCOM* 2004, March 2004), FAST (C. Jin, D. X. Wei and S. H. Low, "FAST TCP: Motivation, Architecture, Algorithms, Performance," *In Proceedings of IEEE INFOCOM* 2004, March 2004), H-TCP (R. Shorten and D. Leith, "H-TCP: TCP for High-Speed and Long-Distance Networks," *Second International Workshop on Protocols for Fast Long-Distance Networks*, Feb. 16-17, 2004, Argonne, Ill.) to further improve TCP's throughput performance.

These solutions addressed the limitation of CWnd growth and thus are complementary to the present invention.

Receiver-Based Approaches

At the receiving end, Fisk and Feng proposed dynamic right-sizing of the AWnd by estimating the CWnd at the receiver and then dynamically adapt the receiver buffer size, i.e., the AWnd, to twice the size of the estimated CWnd. (M Fisk and W-C Feng, "Dynamic Right-Sizing in TCP," *Proceedings of the Los Alamos Computer Science Institute Symposium*, October 2001) This ensures that when the sender's CWnd doubles (e.g., after receiving an ACK) the AWnd will not become the bottleneck.

More recent operating systems such as Linux 2.4 and Microsoft Windows Vista also implemented receiver buffer size auto-tuning by estimating the BDP from the data consumption rate. (See J. Davies, "The Cable Guy: TCP Receive Window Auto-Tuning," *TechNet Magazine*, January 2007.)

What is needed is a mechanism to enable TCP to fully utilize the underlying network bandwidth without the need for modifying network applications running on both ends of the communication session nor requiring Large Window Scale (LWS) support from the operating system.

SUMMARY OF THE INVENTION

According to the invention, in a packet communication system with a communication link having a very large bandwidth delay product (BDP) and employing Transmission Control Protocol (TCP), the system having a transmitter, a receiver and a gateway, the reported advertised window size as advertised by the receiver is employed only as an indication of window size and not as a throughput limit so that more data is sent than the amount specified by the advertised window size as advertised. This advertised window size is consistently at a small but upper limit. Given the high processing speed capabilities of conventional receivers as compared to the typical data rates, the receiver has no trouble processing all incoming TCP packets so that the receiving buffer is consistently near empty. The advertised window size is thus not accepted as the absolute amount of buffer space available at the receiver. Consequently the sender is no longer constrained by the absolute value of the receiver's advertised window size and instead can transmit more data than the value of the advertised window, enabling the communication system to increase the actual window size without modifying either end of the communicating applications. This improved large-BDP-capable protocol is denoted TCP-SC.

A TCP-SC gateway according to the invention is designed to carry out this new function so that when it receives an acknowledgement (ACK) packet from the receiver which carries an updated advertised window size (AWnd), it will compute a new virtual advertised window size (VWnd) that takes into consideration the receiver's processing capability and buffer availability to enable it to forward more data than the AWnd would allow. TCP-SC does not require any modification to the receiver application or require support from the operating system, and so can be more readily deployed by an Internet service provider (ISP) or a satellite operator or a mobile network operator to accelerate all TCP traffics.

The invention will be better understood by reference to the following detailed description in connection with the accompanying drawings.

DETAILED DESCRIPTION OF THE INVENTION

Figure 1:
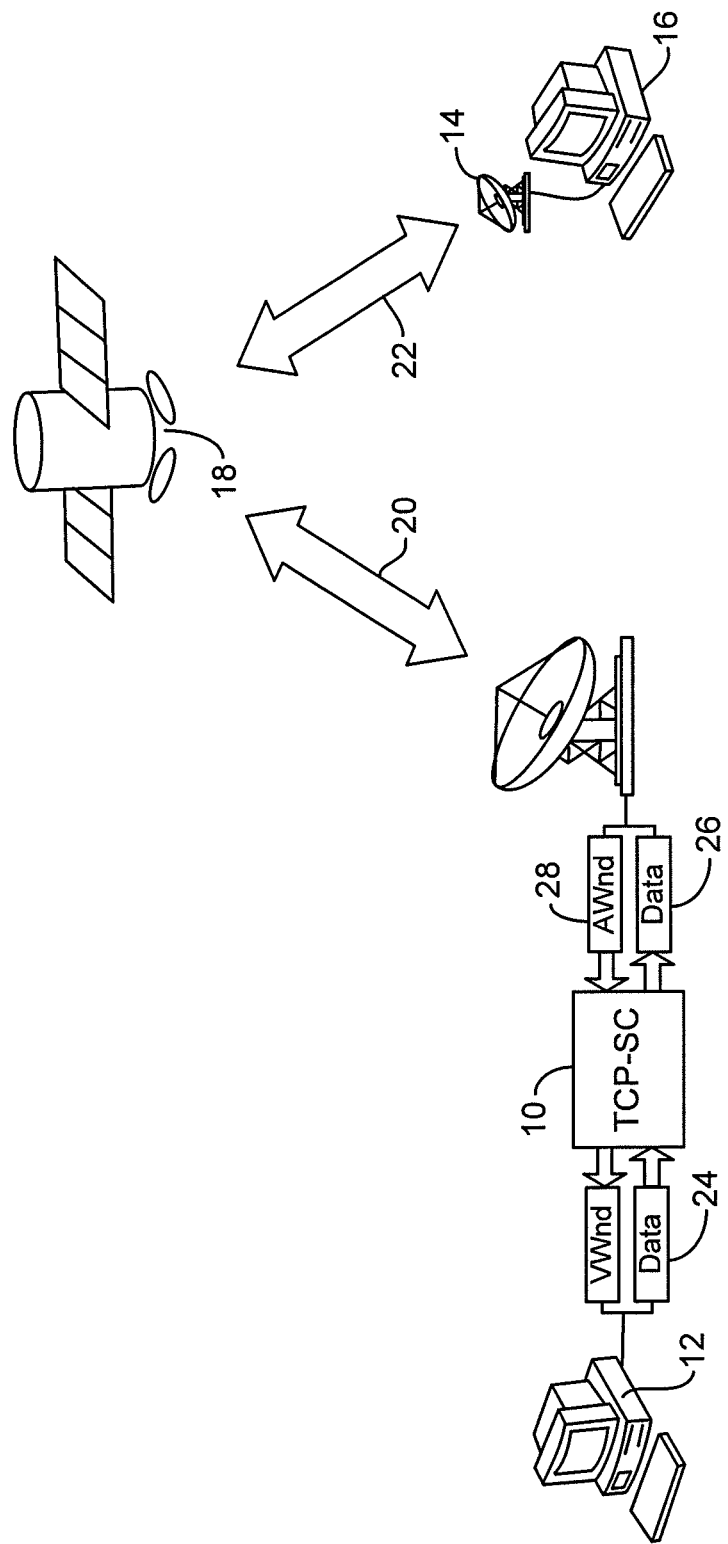
FIG. 1 is a block diagram of a system according to the invention.
Figure 2:
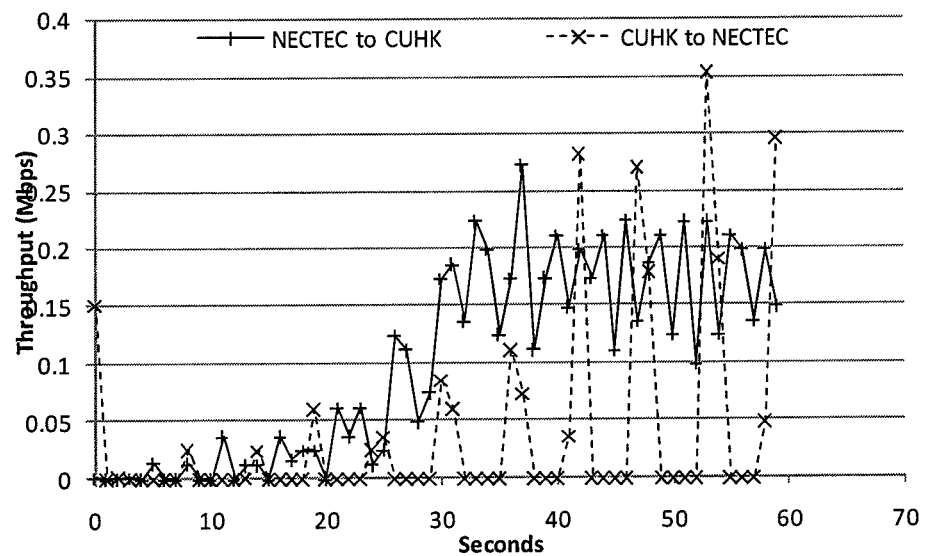
FIG. 2 is a graph illustrating throughput rates of a large BDP system where the traffic flow is interrupted due to protocol anomalies.

According to the invention, a communication system has a TCP-SC gateway system 10. The inventive TCP-SC gateway system 10 is disposed between a sender, such as a web server 12, and a receiver 14 comprising a TCP buffer at a user terminal, such as a web browser client 16, as shown in FIG. 1. All Internet Protocol (IP) packets are routed through the TCP-SC gateway 10 before forwarding to the receiver 14 via a satellite 18. Thus in the case of a satellite system, the path between the gateway system 10 and the client 16 is a large BDP path comprising link segments 20 and 22. The TCP-SC gateway system 10 filters out TCP packets for processing and simply forwards all other packets to maintain compatibility with other traffic (e.g., UDP-based protocols).

The principle of TCP-SC is to estimate the receiver's TCP buffer availability at the time the to-be-forwarded TCP segment arrives at the receiver 14. If the estimated TCP buffer availability is sufficiently large to accommodate the TCP segment, then it will be forwarded to the receiver 14 immediately. Otherwise the gateway system 10 defers transmission to a later time until sufficient receiver buffer space is predicted to become available.

To predict the receiver TCP buffer space availability, the TCP-SC gateway system 10 needs three inputs, namely: the receiver's TCP buffer availability at a previous time instant; the time it takes for the forwarded TCP segment to arrive at the receiver 14; and the rate at which the receiver application processes data received inside the TCP buffer (i.e., remove received data from the TCP buffer). The first input can be determined from the AWnd in the last ACK received. The remaining two inputs need to be estimated as hereinafter explained.

In the following it is assumed: (a) the gateway 10 always has input data 24 to forward as outputdata 26; (b) network delays remain constant; (c) network delays of the link 20, 22 between the gateway 10 and the client 16 are symmetric in the forward and the reverse direction; and (d) the receiver 14 at the client 16 generates an ACK containing the advertised window size immediately upon the arrival of a TCP segment, i.e., there is zero effective processing delay.

Gateway-Receiver Roundtrip Time (RTT) Estimation

Consider the following: Let D be the round trip time RTT between the gateway 10 and the client 16. The RTT is not known a priori and thus will need to be estimated from measurements. Let $f_i$ be the time packet i was forwarded by the gateway 10 to the client 16, and let $t_i$ be the time at which the corresponding ACK arrived at the gateway 10. Then the RTT D can be computed from:

$$D = t_i - f_i \qquad (1)$$

for assumed symmetric network delays.

To smooth out random fluctuations in the estimated RTT, the gateway will apply exponentially weighted moving averaging to the measured values:

$$RTT' = \alpha \times RTT + (1-\alpha) \times D \quad (2)$$

where the weight α=0.9 follows the ones used in TCP's internal RTT estimator as reported by V. (Jacobson and M. Karels, "Congestion Avoidance and Control," available as of Jun. 39, 2009 at ftp://ftp.ee.lbl.gov/papers/congavoid.ps.Z).

Receiver Processing Rate Estimation

The processing rate at the receiver 14 can be estimated from comparison of the receiver's buffer availabilities between two time instants. The time at which acknowledgement packets or ACKs arrive at the gateway are good candidates for these two time instants, as every ACK packet contains the receiver buffer availability inside a field known as the AWnd field 28 (as shown input to the TCP-SC10).

Let $t_i$ and $a_i$ be the respective arrival time and the AWnd value of ACK packet i. Let $f_j$ and $q_i$ be the time TCP packet j was forwarded by the gateway 12 and the segment size of the packet i respectively. Then for some positive integer k, the processing rate, denoted by R, can be computed from:

$$R = \frac{(a_{i+k} - a_i) + \sum_{\forall j | f_j \in (t_i, t_{i+k}]} q_i}{t_{i+k} - t_i} \quad (3)$$

where the first term in the numerator is the difference in the receiver's buffer availability and the second or summation term is the total amount of data transmitted during the time interval. The parameter k controls the width of the estimation interval (in number of ACK packets) and can be adjusted to trade off between accuracy and timeliness of rate estimation. Exponentially weighted moving averaging similar to Equation (2) is applied to R to smooth out random fluctuations.

Gateway Transmission Scheduling

Whenever a TCP segment is received from the sender 12, the gateway 10 must schedule it for transmission to the receiver 14 such that it will not cause buffer overflow at the receiver 14. The challenge is that the AWnd reported in the last ACK packet is delayed information—it was the receiver's buffer availability at one-half the round trip time previously (0.5 D's ago). During the time the ACK packet has traveled to the gateway 10, additional TCP segments may have arrived at the receiver 14, and the receiver application may have processed more data from the receiver TCP buffer.

To account for these two factors, the gateway 10 can compute the predicted receiver TCP buffer availability at a future time t, denoted by B(t) from:

$$B(t) = a_i - \sum_{\forall j | ((f_j + 0.5D) \leq t) \cap (f_j > (t_i - 0.5D))} + R(t - t_i) \quad (4)$$

where the first term is the AWnd 28 reported by the $i^{th}$ ACK to the TCP-SC gateway 10, the second term is the predicted total amount of data arriving at the receiver 14 from time $t_i$ to time t, and the last term is the predicted amount of data which will be processed at the receiver 14 by time t.

The scheduling problem can be restated as finding the set of transmission schedule $\{f_j | j=0, 1, \ldots\}$ such that $B(t) \geq 0 \forall t$. In practice, this can be done whenever a TCP segment, such as segment i, is received from the sender 12. The gateway 10 then determines $f_i$ according to the previous constraint and then queues it for transmission. Queued TCP segments will then be processed in a first in, first out (FIFO) manner with the head-of-line segment transmitted when the current time reaches the schedule time $f_i$.

The foregoing solution has been emulated as well as tested in a satellite communication system and found to be a substantial improvement over conventional TCP. In actual experiments, UDP data transmission using the protocol according to the invention achieved throughput of 40 Mbps with negligible packet loss as compared to conventional TCP rates of 0.5 Mbps throughput with a 64 KB window size and a 1 second RTT.

Network bandwidth limit was emulated using features built into a Linux kernel and network delay was emulated by the gateway itself. This resulted in a BDP of 3 MB, which is significantly larger than the default receiver buffer size. The TCP connection was initiated by the receiver and then the sender kept sending data to the receiver at a maximum allowed rate under TCP. TCP throughput was logged at the receiver.

The receiver buffer size was set by manually setting the socket buffer size. With the inventive TCP-SC, various receiver buffer sizes were tested: 64 KB, 1 MB, 2 MB, and 4 MB respectively, and they were compared the case of TCP-SC with 64 KB buffer size. As expected, TCP throughput increased proportionally with the receiver buffer size. In comparison, with TCP-SC, in-place TCP can achieve throughput similar to the case of 4 MB receiver buffer size. However, since the BDP is only 3 MB, this implies that the achieved throughput is no longer receiver-buffer-limited. In fact the link utilization reached 98.63% for TCP-SC and 98.86% for 4 MB buffer size respectively. (See Table below).

| Average throughput after TCP stabilizes (from 25 s to 40 s) | | | | | |
|---|---|---|---|---|---|
| | Receive buffer size (KB) | | | | |
| | 64 | 64 | 1024 | 2048 | 4096 |
| With gateway | Y | N | N | N | N |
| Throughput (Mbps) | 23.67 | 0.53 | 8.69 | 17.39 | 23.72 |
| Link utilization (%) | 98.63 | 2.20 | 36.21 | 72.45 | 98.86 |

Figure 3:
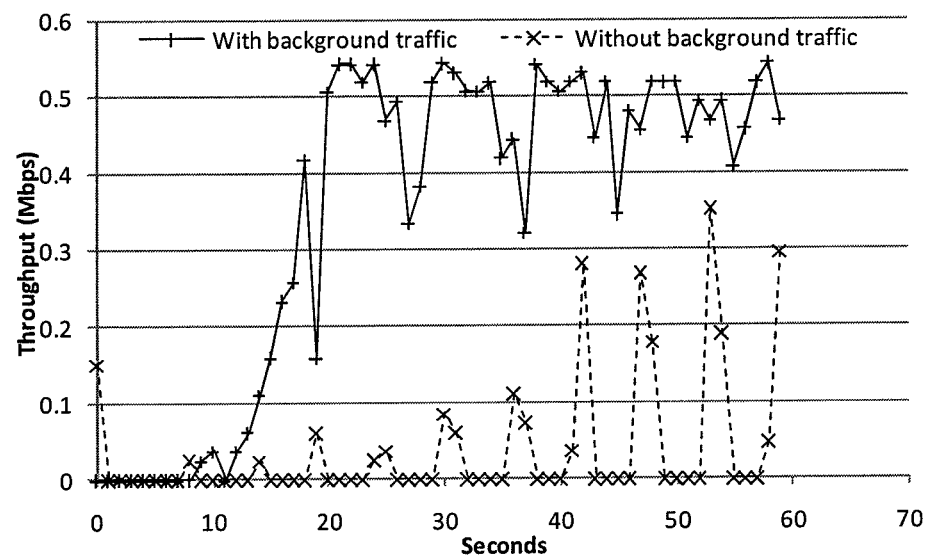
FIG. 3 is a graph illustrating throughput rates in a system fully functional according to the invention.

Plots of the AWnd of all five sets of experiments are shown below. It is worth noting that regardless of the receiver buffer size setting, the buffer availability stays at the maximum buffer size setting. This suggests that the receiver application's processing rate is higher than the network bandwidth, so that data arriving at the receiver is quickly retrieved and cleared from the buffer. FIG. 3 plots the TCP throughput versus time for both directions of data transfer in a live experiment over a two-way satellite link. It was found that TCP flow in at least one direction periodically stopped transmitting data completely for a significant duration, evidently due to automat release of the satellite downlink after channel idle time, requiring a lengthy channel setup process to re-establish the downlink. However, by introducing a background UDP data flow in parallel to the TCP data flow, the channel could be kept sufficiently busy so that the downlink channel was not released. This is illustrated by the solid line in FIG. 3, where there is a dramatic increase in TCP data throughput. There were extra buffers allocated to assure full utilization of the network. Although the 4 MB setting also enabled TCP to fully utilize the network, the extra buffers allocated were in fact not used at all. By contrast, TCP-SC according to the invention enabled existing TCP to fully utilize network bandwidth without the need for large buffers and modifications to the receiver application.

Conclusion

The performance of TCP running over large BDP networks is improved by introducing a TCP-SC gateway between the sender (host) and the receiver (client). Compared to known solutions, the inventive TCP-SC gateway exhibits two desirable properties: (a) it does not require modification to the applications, to the TCP implementation at the hosts, or to the operating system; and (b) it significantly reduces the receiver buffer requirement. TCP-SC is compatible with existing TCP flows and can readily enable them to fully utilize available network bandwidth. It can be deployed as part of a satellite or mobile data communications network and is completely transparent to its users.

The invention has been explained with reference to specific embodiments. Other embodiments will be apparent to those of ordinary skill in this art. Therefore, the invention is not to be considered limited, except as indicated by the appended claims.

What is claimed is:

1. In a packet communication system with large bandwidth delay product (BDP) and employing Transmission Control Protocol (TCP) at a gateway, a method for communicating TCP data flow comprising:
    transmitting data via the gateway through a communication link from a sender device to a receiver device associated with a client;
    receiving at the gateway an advertised window size as advertised by the receiver device at a delay from its measurement; and
    employing the advertised window size at the gateway only as an indication of window size and not as a limit on amount of data that can be transmitted from the gateway to the receiver so that more data can be sent via the gateway than specified by the advertised window size, where the advertised window size occurs during an acknowledgement transmission that reports buffer availability at about one-half of a round trip time in the past.

2. In a packet communication system with large bandwidth delay product (BDP) and employing Transmission Control Protocol (TCP) at a gateway, a method for communicating TCP data flow comprising:
    transmitting data in a first TCP segment via the gateway through a communication link having a path delay from a sender device to a receiver associated with a client, the link having a path delay;
    receiving at the gateway an acknowledgement packet containing an advertised window size as advertised by the receiver device; and
    upon receipt of a next TCP segment from the sender device, causing the gateway to schedule said next TCP segment for transmission to the receiver device such that it will not cause buffer overflow at the receiver device, where the advertised window size is obtained from information in the latest acknowledgement transmission from the client; further including the steps of:
    predicting receiver buffer availability at future time t as B(t) according to:

$$B(t) = a_i - \sum_{\forall j | ((f_j + 0.5D) \leq t) \cap (f_j > (t_i - 0.5D))} q_j + R(t - t_i) \quad (4)$$

where first term a is the advertised window size reported by the $i^{th}$ acknowledgement, second term $\Sigma q$ is the predicted total amount of data arriving at the receiver device from time $t_i$ to time t, and third term R is the predicted amount of data that will be processed by time t, wherein the gateway has data to forward; network delays remain constant;
    network delays are symmetric in forward and reverse directions; and the receiver device generates the acknowledgement packet containing the advertised window size immediately upon the arrival of a the first TCP segment such that there is zero effective processing delay.

3. In a packet communication system with large bandwidth delay product (BDP) and employing Transmission Control Protocol (TCP) at a gateway, a method for communicating TCP data flow comprising:
    transmitting data in a first TCP segment via the gateway through a communication link having a path delay from a sender device to a receiver associated with a client, the link having a path delay;
    receiving at the gateway an acknowledgement packet containing an advertised window size as advertised by the receiver device; and
    upon receipt of a next TCP segment from the sender device, causing the gateway to schedule said next TCP segment for transmission to the receiver device such that it will not cause buffer overflow at the receiver device, where the advertised window size is obtained from information in the latest acknowledgement transmission from the client; further including the steps of:
    estimating a predicted amount R of data that will be processed by a time t according to:

$$R = \frac{(a_{i+k} - a_i) + \sum_{\forall j | f_j \in (t_i, t_{i+k}]} q_i}{t_{i+k} - t_i} \quad (3)$$

where the first term a in the numerator is a difference in buffer availability of the receiver, the second or summation term is total amount of data transmitted during a time interval of the numerator, and parameter k controls width of an estimation interval where k is number of ACK packets.

4. In a packet communication system with large bandwidth delay product (BDP) and employing Transmission Control Protocol (TCP) at a gateway, a method for communicating TCP data flow comprising:
    transmitting data in a first TCP segment via the gateway through a communication link having a path delay from a sender device to a receiver associated with a client, the link having a path delay;
    receiving at the gateway an acknowledgement packet containing an advertised window size as advertised by the receiver device; and
    upon receipt of a next TCP segment from the sender device, causing the gateway to schedule said next TCP segment for transmission to the receiver device such that it will not cause buffer overflow at the receiver device, where the advertised window size is obtained from information in the latest acknowledgement transmission from the receiver device where the advertised window size occurs during an acknowledgement transmission that reports buffer availability at about one-half of a round trip time in the past.

* * * * *